United States Patent [19]

Miller et al.

[11] Patent Number: 5,293,480
[45] Date of Patent: Mar. 8, 1994

[54] HIGH RESOLUTION GRAPHICS SYSTEM ARCHITECTURE

[75] Inventors: Robert W. Miller, Hazlet; John H. Spicer, Scotch Plains, both of N.J.

[73] Assignee: AT&T Bell Laboratories, Murray Hill, N.J.

[21] Appl. No.: 13,488

[22] Filed: Feb. 1, 1993

Related U.S. Application Data

[63] Continuation of Ser. No. 563,135, Aug. 6, 1990.

[51] Int. Cl.⁵ ............................................. G06F 15/62
[52] U.S. Cl. .................................................. 395/163
[58] Field of Search ........................................ 395/163

[56] References Cited

U.S. PATENT DOCUMENTS

| | | | |
|---|---|---|---|
| 4,107,780 | 8/1978 | Grimsdale et al. | 395/163 X |
| 4,217,660 | 8/1980 | En | 371/44 |
| 4,449,201 | 5/1984 | Clark | 395/163 X |
| 4,543,645 | 9/1985 | Vigarie | 364/900 |
| 4,648,045 | 3/1987 | Demetrescu | 395/163 |
| 4,737,921 | 4/1988 | Goldwasser et al. | 395/163 X |
| 4,837,447 | 6/1989 | Pierce et al. | 395/163 X |
| 4,860,248 | 8/1989 | Lumelsky | 395/163 |
| 5,109,520 | 4/1992 | Knierim | 395/163 X |
| 5,157,765 | 10/1992 | Birk et al. | 395/163 |

FOREIGN PATENT DOCUMENTS

59-172064  9/1984  Japan .................................. 395/163

*Primary Examiner*—Mark K. Zimmerman
*Attorney, Agent, or Firm*—John A. Caccuro

[57] ABSTRACT

A graphics generation system includes a column-interleaved distributed frame buffer and data routing apparatus which directs graphics commands to only a selected group of rendering processing elements (RPEs) required to render a given object to be displayed. In one embodiment, the system specifies this selected group of processing elements using a starting and ending RPE number. This starting and ending RPE number is used to selectively enable only those processing elements needed to process the object data and render the object to be displayed.

16 Claims, 5 Drawing Sheets

MODIFIED COLUMN INTERLEAVED FRAME BUFFER

| LINE NUMBER | COLUMN | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | ... | 1276 | 1277 | 1278 | 1279 | 1280 |
| 1 | 1 | 2 | 3 | 4 | 5 | 6 | 7 | 8 | 1 | 2 | ... | 4 | 5 | 6 | 7 | 8 |
| 2 | 1 | 2 | 3 | 4 | 5 | 6 | 7 | 8 | 1 | 2 | ... | 4 | 5 | 6 | 7 | 8 |
| 3 | 1 | 2 | 3 | 4 | 5 | 6 | 7 | 8 | 1 | 2 | ... | 4 | 5 | 6 | 7 | 8 |
| ... | ... | ... | ... | ... | ... | ... | ... | ... | ... | ... | | ... | ... | ... | ... | ... |
| 512 | 1 | 2 | 3 | 4 | 5 | 6 | 7 | 8 | 1 | 2 | ... | 4 | 5 | 6 | 7 | 8 |
| 513 | 9 | 10 | 11 | 12 | 13 | 14 | 15 | 16 | 9 | 10 | ... | 12 | 13 | 14 | 15 | 16 |
| 514 | 9 | 10 | 11 | 12 | 13 | 14 | 15 | 16 | 9 | 10 | ... | 12 | 13 | 14 | 15 | 16 |
| 515 | 9 | 10 | 11 | 12 | 13 | 14 | 15 | 16 | 9 | 10 | ... | 12 | 13 | 14 | 15 | 16 |
| ... | ... | ... | ... | ... | ... | ... | ... | ... | ... | ... | | ... | ... | ... | ... | ... |
| 1024 | 9 | 10 | 11 | 12 | 13 | 14 | 15 | 16 | 9 | 10 | ... | 12 | 13 | 14 | 15 | 16 |

Columns 1–10 belong to region 301; columns 1276–1280 belong to region 302.

HIGH RESOLUTION GRAPHICS SYSTEM ARCHITECTURE

This application is a continuation of application Ser. No. 07/563,135, filed on Aug. 6, 1990.

TECHNICAL FIELD

This invention relates to graphics systems and, more particularly, to a graphics system that employs parallel processing techniques for the generation and processing of three-dimensional images for display on a raster display system.

BACKGROUND OF THE INVENTION

As computing technology progresses, it is apparent that the single-processor model of executing at most one instruction in every machine cycle will be supplanted in many applications by parallel-processor arrangements. One such application for parallel-processors is in the computer graphics field where image processing requires picture elements (pixels) to be read, written and processed simultaneously. Image processing constantly requires faster machines to process ever-increasing amounts of data and to render higher quality images in less time.

Systems used to generate and manipulate 3D (three-dimensional) images typically include a transformation processing subsystem, a rendering subsystem, a frame buffer, and a raster display subsystem. The transformation processing subsystem performs operations including 3D transformations, clipping, shading and projection. These are operations that are required to convert the data from 3D "world coordinates" into the coordinates needed to render an object on the raster display.

The rendering subsystem takes the output of the transformation processing subsystem and renders the objects as pixels in the frame buffer. This process includes operations such as raster conversion, shading calculations, texture mapping and anti-aliasing.

The frame buffer is a memory subsystem that is used to store the image that is being generated. The information in the frame buffer can be read and written by the rendering subsystem, and is read by the raster display subsystem to generate data in the next display.

The raster display subsystem converts the data in the frame buffer into a video output image signal. The raster display subsystem must be able to read sequential pixels from the frame buffer very quickly in order to generate the video output signal.

The implementation of a rendering subsystem frequently includes a number of processing elements operating in parallel to satisfy the computational demands of the rendering task. It is important for the processing elements of the rendering subsystem to be able to quickly read and write pixels to and from the frame buffer. Frame buffer access for parallel rendering subsystems is difficult because of the very high-bandwidth required by the frame buffer interface.

A prior art solution to the frame buffer access problem is to make each processor responsible for generating a specified set of the pixels in the frame buffer, and distributing the frame buffer memory among the processing elements such that each processing element has sufficient memory to store the pixels for which it is responsible. Frame buffers that utilize this technique are referred to as distributed frame buffers. It is possible to allocate pixels to distributed frame buffer elements in many different ways. These include contiguous block, 2D interleaved, scan line interleaved, and column interleaved.

The ever-increasing computer performance requirements provide a continuing challenge to improve distributed frame buffer organization and operation in view of competing factors such as load balancing, algorithm efficiency, scalability, and raster display complexity and cost.

SUMMARY OF THE INVENTION

Our invention is a graphics generation system that provides effective load balancing, high algorithm efficiency, scales to a large number of processing elements, and supports a simple and flexible raster display system. More particularly, our invention assigns columns of pixels of an image to successive processor elements on a cyclically recurring basis (using a column-interleaved distributed frame buffer) and employs a data routing scheme that directs object data to only those processing elements required to render a given object. In one embodiment, our system includes a transformation processing subsystem that determines which group of the rendering processing elements (RPEs) are required to render an object and communicates this information to the rendering subsystem. According to one feature of the invention, the transformation subsystem specifies a starting and ending processing element number. The rendering subsystem translates the starting and ending processing element number into a control signal for each processing element that specifies whether it is required to render the object. This control signal is used to enable or disable the input to the processing element.

DETAILED DESCRIPTION

Figure 1:
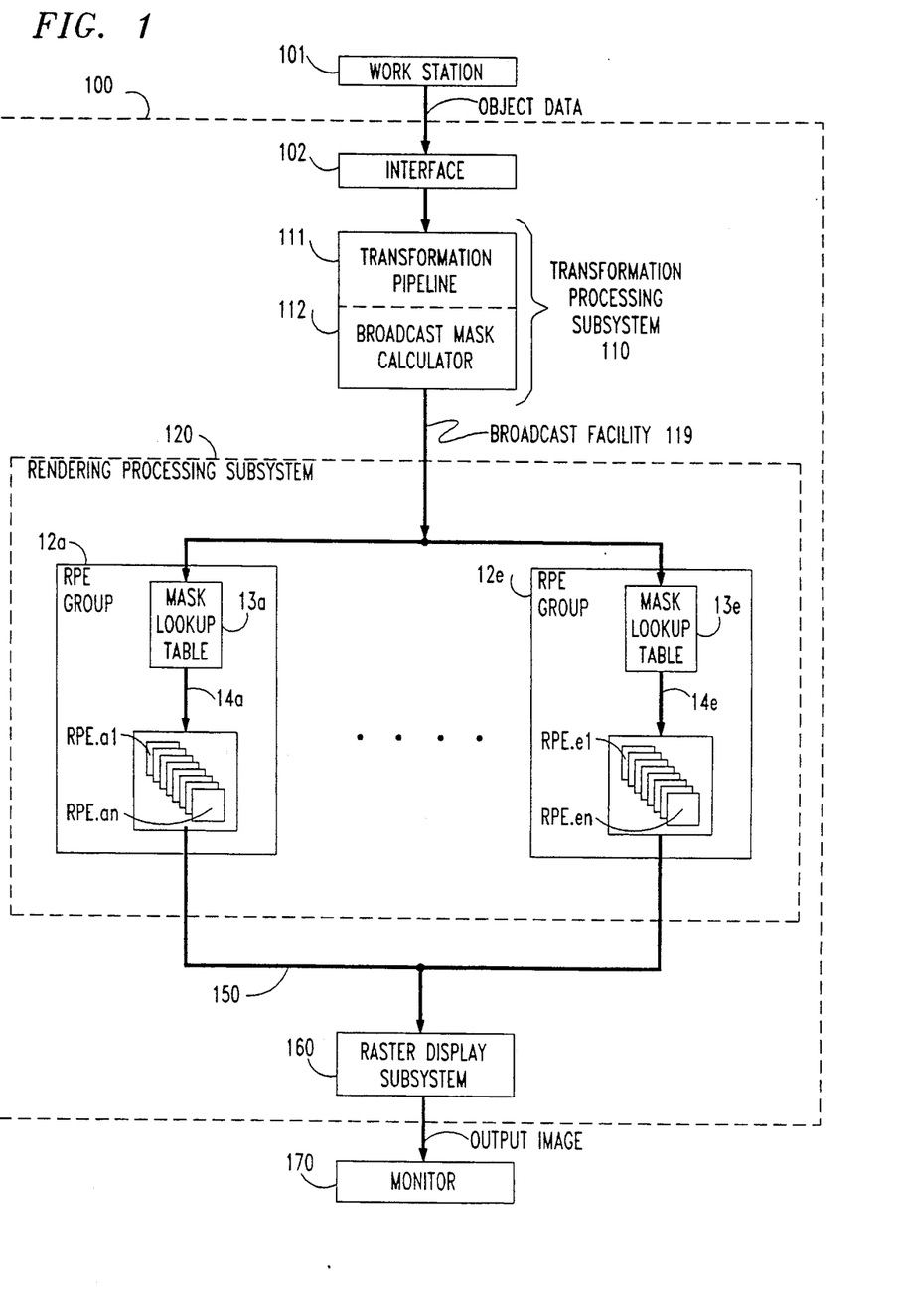
FIG. 1 is an illustrative block diagram of a graphics system in accordance with the present invention.

FIG. 1 represents a block diagram of a 3D graphics generation system 100 including interface circuit 102, transformation processing subsystem 110, broadcast facility 119, rendering processing subsystem 120 (including RPE groups 12a–12e, where each RPE includes a part of the distributed frame buffer) raster display facility 150 and raster display system 160. The rendering subsystem 120 includes multiple Rendering Processing Element (RPE) groups 12a–12e, each of which includes a mask lookup table (e.g., 13a) a control bus (e.g., 14a), and a plurality of RPEs (e.g., RPE.a1-RPE.en).

The graphics generation system 100 shown in FIG. 1 may be part of apparatus such as graphics workstations, auxiliary graphics processors, etc. The graphics system shown in FIG. 1 typically receives graphics commands via interface circuit 102 from a general purpose processor, e.g., workstation 101. The output of system 100 is displayed on monitor 170.

The transformation pipeline 111 of the transformation processing subsystem 110 performs well-known operations including 3D transformations, clipping, shading and projection. These are operations that are required to convert external 3D data, illustratively, provided by workstation 101, into the coordinates needed to render an object on the raster display. The transformation subsystem also determines which rendering processing elements (RPEs) are required to render an object to be displayed on monitor 170 and communicates this information to rendering subsystem 120. The transformation subsystem 110 includes a transformation pipeline 111 and broadcast mask calculator 112. The novel function of the broadcast mask calculator 112 is described in a later paragraph.

The rendering subsystem 120 receives the output of transformation processing subsystem 110 via broadcast facility 119 and renders the objects as pixels in the frame buffer. This process includes well-known operations such as raster conversion, shading calculations, texture mapping and anti-aliasing. Rendering subsystem 120 uses a number of rendering processing elements RPE.a1 to RPE.en arranged in RPE groups 12a–12e operating in parallel to satisfy the computational demands of the rendering task. The mask lookup tables 13a–13e are used to selectively distribute the data from transformation processing subsystem 110 to the appropriate RPE groups 12a–12e. It is important for the RPEs.a1 to RPE.en of the rendering subsystem 120 to be able to quickly read and write pixels to and from their associated section of the distributed frame buffer.

The frame buffer is a memory subsystem that is used to store the image that is being generated. The frame buffer is distributed into a plurality of sections, each section being part of each RPE.a1 to RPE.en of each RPE group 12a–12e of FIG. 2. The information in the frame buffer can be read and written by rendering subsystem 120 and is read by raster display subsystem 160 to generate the video data for the next display.

The raster display subsystem 160 converts the data in the frame buffer into a video or image output signal for display on a monitor 170. The raster display subsystem 160 should be able to read sequential pixels from each of the frame buffer sections RPE.a1 to RPE.en very quickly in order to generate the video output signal.

In accordance with the present invention, the graphics system 100 of FIG. 1 attains superior performance by employing a column interleaved distributed frame buffer (FIG. 2) with a masking feature (using mask lookup tables 13a–13e) that directs the output of the transformation subsystem (110) to only those rendering processing elements (RPEs) of RPE groups 12a–12e which are required for rendering a given graphical object to be displayed. A rendering subsystem 120 containing N processing elements (RPE) may be arranged in any combination of RPE groups and number of RPEs per group whose product is N.

In our FIG. 1 example, we assume that each RPE group (e.g., RPE12a) contains N RPEs (namely, RPE.a1 through RPE.en). The total number of RPEs is equal to the number(e) of RPE groups, times the number (n) of RPEs per RPE group. The total number of RPEs is en and is thus defined to be equal to N.

Figure 2:
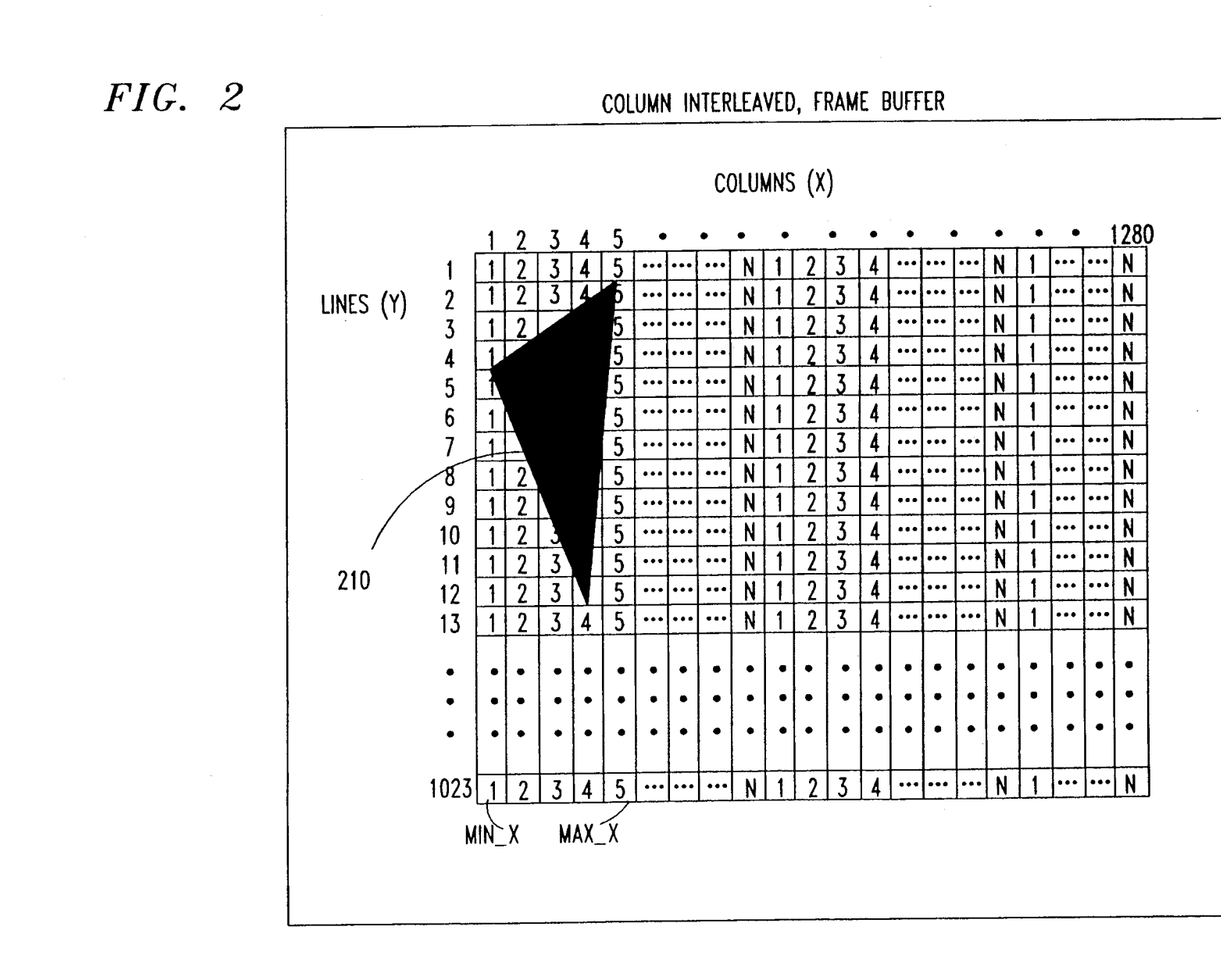
FIG. 2 shows a column interleaved frame buffer and an example of polygon rasterization using column interleaving.

With reference to FIG. 2, there is shown an illustrative mapping of the X, Y screen display coordinates of monitor 170 to the N RPEs of rendering subsystem 120. In our example, X has 1280 columns and Y has 1024 rows. Transformation pipeline 111 assigns each of the 1280 columns of the image or display to successive N RPEs of rendering subsystem 120 on a cyclically recurring basis.

As shown, the N RPEs are cyclically assigned columns of pixel elements of the display on a column-interleaved basis. In our example, since there are N RPEs, each N columns of pixels is assigned to the same processor. Thus, RPE.a1 (of FIG. 1) is assigned every column designated 1, and RPE.a2 every column designated 2 and so forth until RPE.en is assigned every column designated N. This cyclic assignment of column of pixels of an image to successive rendering processors RPE.a1 to RPE.en is done by rendering processing subsystem 120 in conjunction with raster display subsystem 160.

Figure 3:
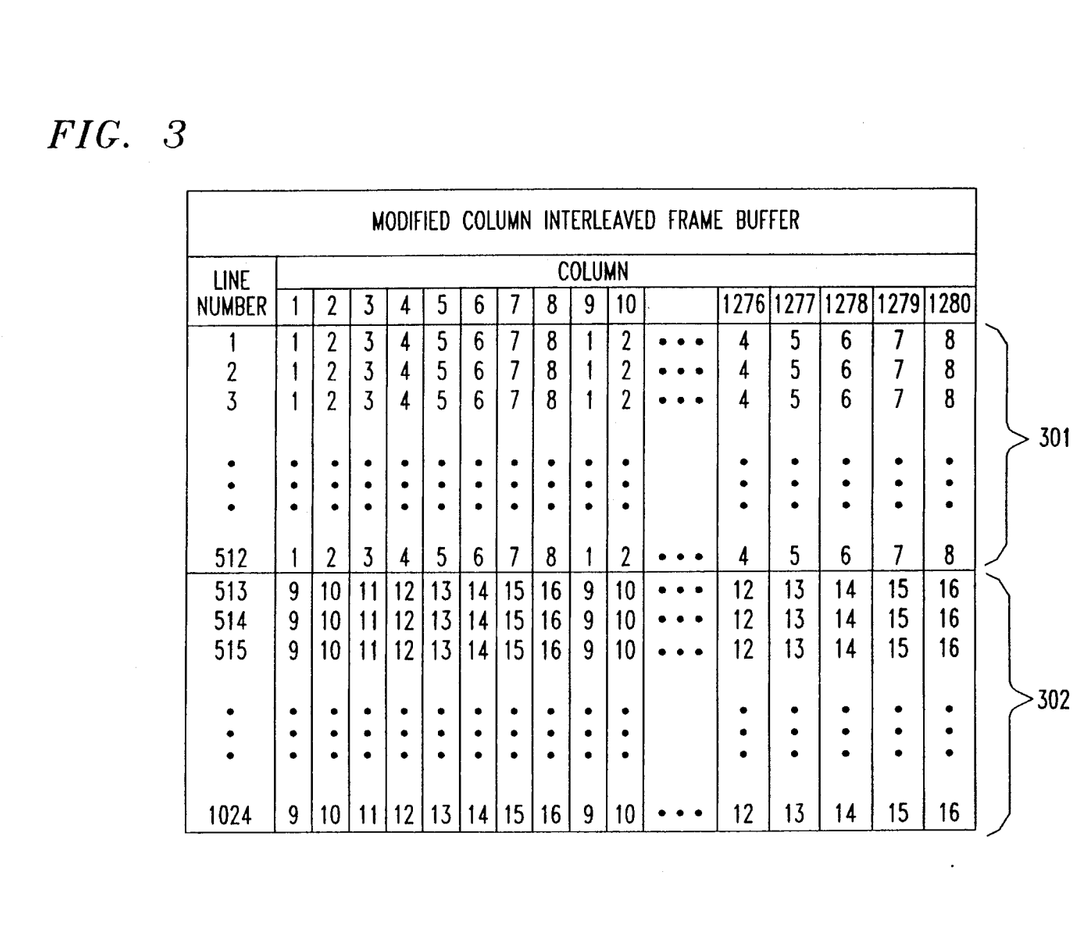
FIG. 3 shows a modified column interleaved frame buffer.

In an alternate arrangement, called the modified column interleaved mode, transformation pipeline 111 splits the rows of the display into two or more segments and assigns pixel columns in each segment on a column-interleaved basis. FIG. 3 illustrates a distributed frame buffer using this modified column-interleaved mode for N=16 processors (RPEs). In this two-segment arrangement eight RPEs (i.e., processors 0–7) are used for segment 301 which handles contiguous rows or lines 1–512, and eight RPEs (i.e., processors 8–15) are used for segment 302 which handles contiguous lines 513–1024. For the purposes of describing the present invention, we assume that the distributed frame buffer is organized as shown in FIG. 2. However, it should be noted that the present invention can be utilized, in a similar manner, by a graphics system having the modified column-interleaved mode arrangement including 2 or more segments.

Retuning to FIG. 1, transformation processing subsystem 110 includes transformation pipeline 111 which performs, in a well-known manner, the standard graphics transformations including object generation; transformation; X, Y, Z clipping; back face removal; triangularization; and projection and view port mapping. In accordance with the present invention, transformation processing subsystem 110 includes a new function performed by broadcast mask calculator 112. The broadcast mask calculator 112 determines which column of pixels are required to render the object to be displayed. This new function includes the specifying of the RPEs that are required to render an object to be displayed. In one embodiment, the broadcast mask calculator 112 specifies the first and last RPEs required to render an object to be displayed. With reference to FIG. 2, RPEs are specified by broadcast mask calculator 112, for an illustrative object 210, as follows:

Compute the minimum and maximum X values (respectively, MIN_X and MAX_X) of the object. For example, since the object 210 is a triangle, we determine the smallest and largest X values based on the 3 vertices. Thus, MIN_X is 1 and MAX_X is 5 for our triangle object 210 in FIG. 2.

Compute the overall width of the object by subtracting the smallest X from the largest X and adding one. Thus, MAX_X minus MIN_X plus one is 5 in our example.

If the width is greater than, or equal to, the number of RPEs (NUM_RPE)

then all RPEs of the rendering subsystem 120 are required to do render processing of the object. In our example, NUM_RPE is equal to N which is greater than 4. Hence for our example, object 210 would be rendered using processors RPE.a1 through RPE.a5 of FIG. 1.

If the width is less than NUM_RPE (as in our example) then the first and last RPEs (FIRST_RPE and LAST_RPE) are computed as follows:

FIRST_RPE=MIN_X modulo NUM_RPE
LAST_RPE=MAX_X modulo NUM_RPE.

If we assume that our system contains a maximum of 80 RPEs (i.e., $N \leq 80$). Consequently, FIRST_RPE and LAST_RPE are each represented as 7 binary bit values. Systems with a smaller or larger number of RPEs can use fewer or more bits to represent these values.

In order for this invention to be used optimally, the calculation done by the broadcast mask calculator 112 should be performed either by special hardware that can perform the calculation more quickly than an RPE could, or by some sort of pipelined or parallel processors in the transformation subsystem 110. In accordance with another feature of the present invention, our system employs a number of transformation processors in subsystem 110 all operating in parallel, each processing a different object. This allows a number of objects to be processed simultaneously.

Figure 4:
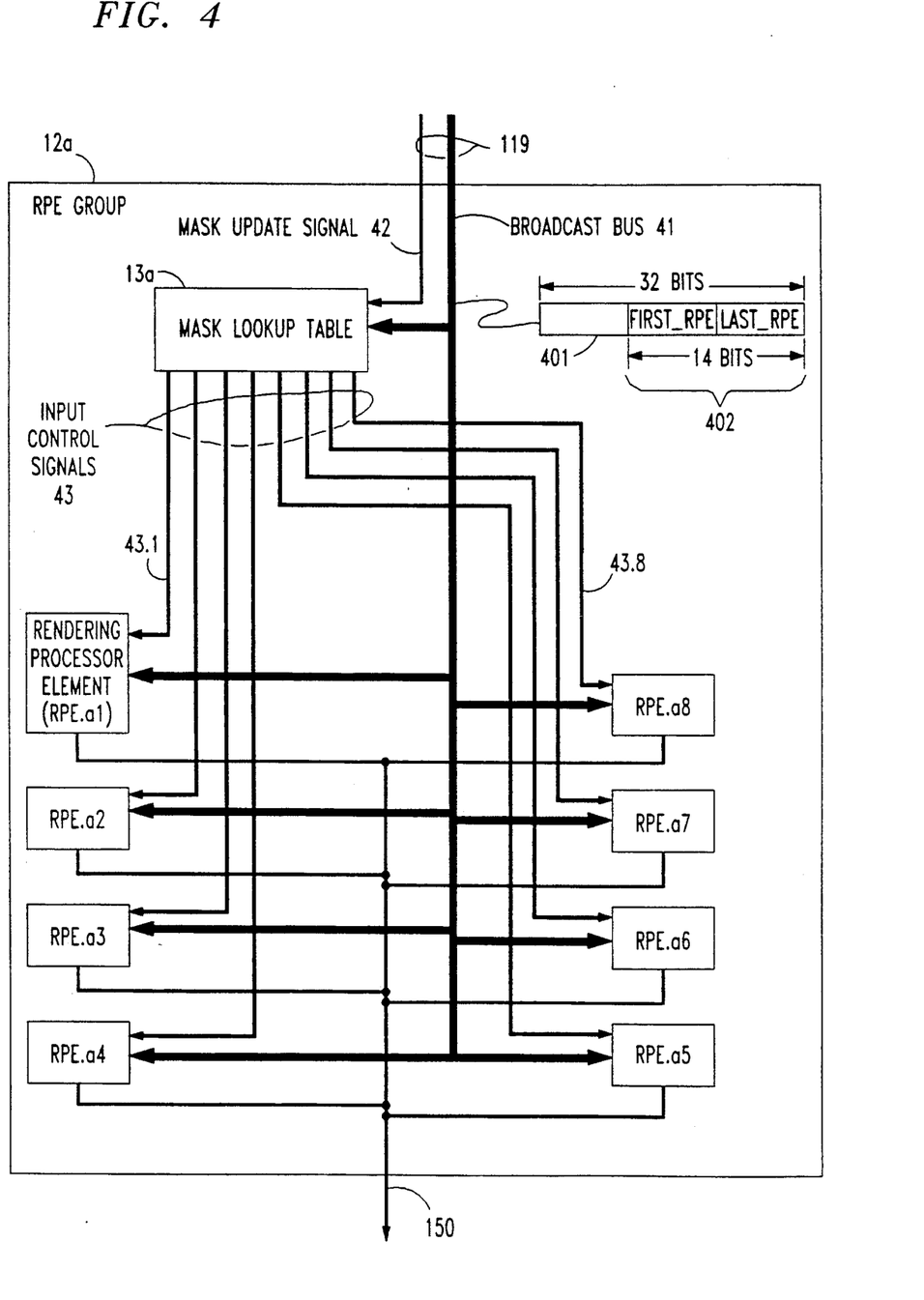
FIG. 4 shows an illustrative block diagram of a Rendering Processor Element (RPE) group.

With reference to FIG. 4, broadcast facility 119 includes a mask update signal 42 and a broadcast bus 41. The broadcast bus 41 is, typically, a 32-bit bus (e.g., see 401) used to transmit information from the output of the transformation subsystem 110 to the rendering subsystem 120. This information is typically directed to all RPE groups of rendering subsystem 120. In accordance with our invention, the function of the broadcast bus includes the transmission of the RPE address message (e.g., 401) which includes the FIRST_RPE and LAST_RPE information to rendering subsystem 120. The mask update signal, MASKUPD 42 has been added to signal the arrival of the RPE address message. The transformation subsystem 110 transmits FIRST_RPE and LAST_RPE by encoding them as bits, 402, of a 32-bit RPE address message 401 and writing them to the broadcast bus 119 while asserting the MASKUPD signal 42.

FIG. 4 also shows an illustrative block diagram of RPE group 12a. The number of RPEs in an RPE group 12a depends on the particular mask lookup table apparatus 13a-e used to translate FIRST_RPE and LAST_RPE into input control signals 43 for the individual RPEs. In our example, we further assume that each RPE group has only eight RPEs. Since RPE group 12a has only eight RPEs (i.e., RPE.a1 through RPE.e8), mask lookup table apparatus 13a translates the RPE message into a maximum of eight input control signals 43.1 through 43.8.

The graphical object data and the FIRST_RPE/LAST_RPE data are received by the RPE.a1 through RPE.a8 and the mask lookup table 13a via the broadcast facility 119. The mask update signal 42 is directed to the mask lookup table 13a to indicate that it should use the present broadcast facility bus 119 message or data as an index into its lookup table. Illustratively, system 100 makes use of a 16k×8 memory device (e.g., a read-only-memory-ROM) as the mask lookup table 13a for each RPE group 12a-12e.

The mask lookup table 13a is a memory device (RAM, ROM, EPROM, etc.). The device uses a 14-bit address (402) and yields an 8-bit output (input control signals 43). In our illustrative system, there are 8 RPEs in each RPE group. As a result, one 16k×8 memory device serves as the mask lookup table for an RPE group.

The 14-bit address 402 is composed of the starting (FIRST_RPE) and ending (LAST_RPE) numbers. Since our system allows up to 80 RPEs, each number can be represented using 7 bits.

Generally, if there are N RPEs in a system, then the mask lookup table will contain $N \times N$ entries. In other words, one entry for each possible starting an ending RPE combination. In order for the mask lookup table to operate, the contents of the lookup table must be different for each RPE group. For example, if a polygon object is to be sent to RPEs 4 to 12, the mask lookup table for the RPE group containing RPEs 0–7 would contain the entry: 0 0 0 0 1 1 1 1 (representing RPEs 0, 1, 2, 3, 4, 5, 6 and 7, respectively). The mask lookup table for the RPE group containing RPEs 8–15 would contain: 1 1 1 1 1 0 0 0 (representing RPEs 8, 9, 10, 11, 12, 13, 14 and 15, respectively). Consequently, if the lookup table is in ROM, each RPE group must have a unique ROM. Alternately, the lookup table can be in a random-access-memory (RAM) that is initialized by the host system, e.g., workstation 101.

As noted, each bit of the mask lookup table 13a serves as an input control signal of one RPE of RPE group 12a. Thus, input control signal 43.1 serves RPE.a1, etc. When the MASKUPD signal 42 is received, the appropriate input control signals (43.1–43.7) are activated and latched in their respective RPEs. The state of the input control signals 43 remains unchanged until the next MASKUPD signal 42 is received. Only those RPEs enabled by an active input control signal process data received over broadcast bus 119. Thus, for our triangular object 211 example of FIG. 2, only RPEs, namely, RPE.a1 through RPE.a5 are active and process data received over broadcast bus 119.

Figure 5:
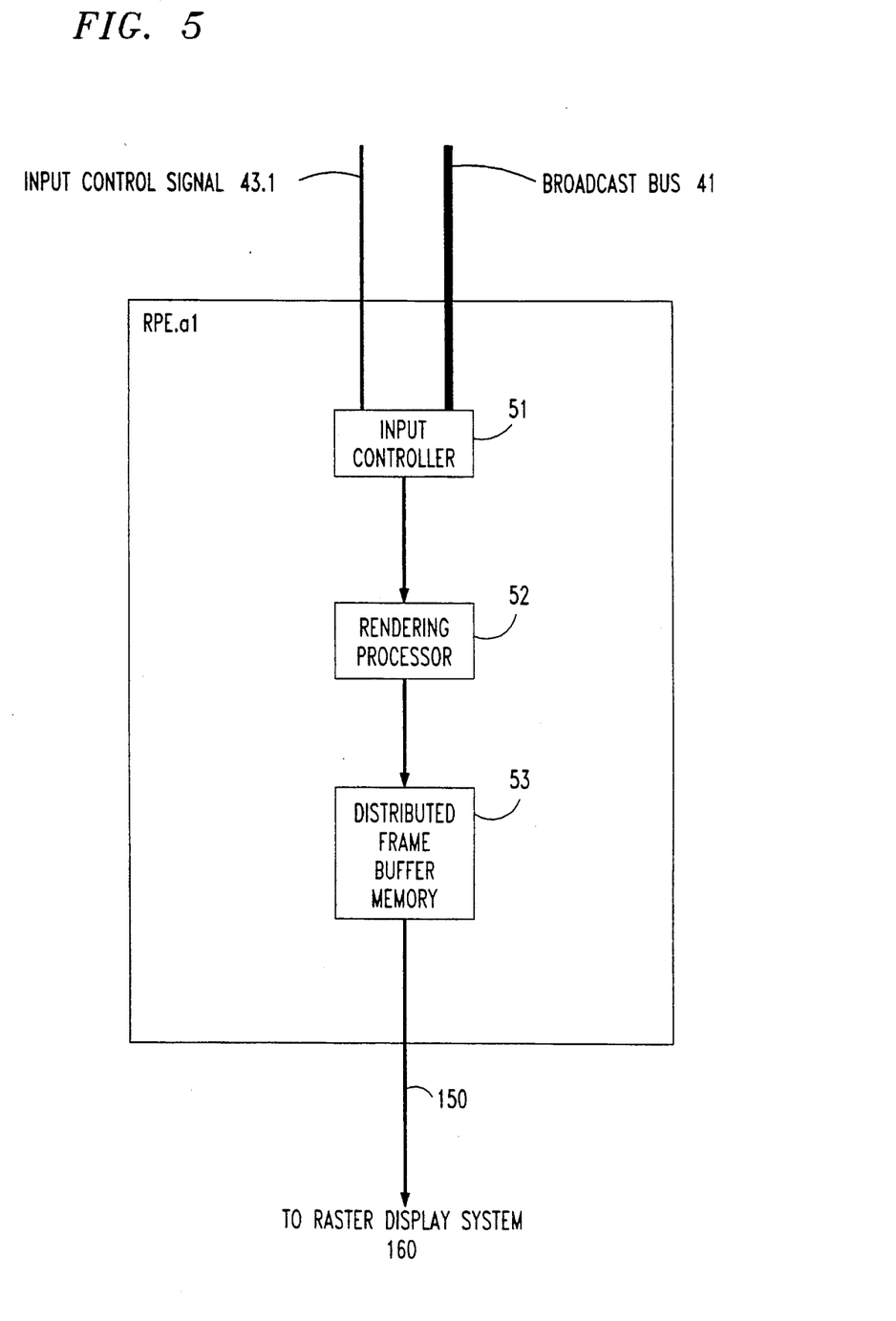
FIG. 5 shows a block diagram of an RPE unit.

FIG. 5 shows an illustrative block-diagram of an individual RPE (e.g., RPE.a1). Each RPE receives as input the data from broadcast facility 119 and an input control signal (e.g. 43.1). The input controller 51 ensures that unless the input control signal 43.1 is asserted, the write signals of the broadcast facility 119 are ignored and hence not processed by rendering processor 52 and stored in distributed frame buffer memory 53.

Thus, in accordance with the present invention, rendering processor 52 receives data only for those graphical objects for which it must render pixels. Rendering processor 52 converts the received data into pixels. The conversion of a graphical object such as triangle object 210 of FIG. 2 into pixels in a frame buffer is known as rasterization. Rasterization is performed by rendering processor 52 in a well-known manner and typically involves the following steps:

1. inputting the description of the object,
2. determining how many rows or columns comprise the object,
3. computing the starting and ending pixels of each row or column,
4. performing the shading calculations for each pixel.

Whether the rasterization process works on a row or column basis depends on the interleaving and frame buffer distribution system employed. Because our system uses column interleaving, the rasterization is done column by column.

Without using the disclosed masking apparatus (i.e., broadcast mask calculator 112 and mask lookup tables 13a–13e), all RPEs of 120 would be required to perform the above steps 1 and 2 even if, as a result, they were not required to process any columns. This severely impairs the ability to increase the number of RPEs in a system. This is because as RPEs are added, each RPE spends an increasing percentage of its time performing steps 1 and 2. According to the present invention, once broadcast mask calculator 112 determines which RPEs are necessary to process an object, each RPE does not have to perform steps 1 and 2 to arrive at the same conclusion. Consequently, using the present invention, RPEs can be added to a system without increasing the percentage of time that each RPE spends performing steps 1 and 2.

While the masking apparatus (i.e., broadcast mask calculator 112 and mask lookup tables 13a through 13e) could be used with other interleaving schemes, the resulting system would not perform as well as column interleaving.

For example, if 2D (two-dimensional) interleaving were used, it would be more difficult to determine which RPEs are required for a given object. Furthermore, the resulting RPE set could not be specified as a range. It would require either a series of ranges or a bit-mask consisting of NUM_RPE bits. Both of which would be difficult to implement unless NUM_RPE was small (e.g. 32). Even if this problem could be solved, the results would be poor since virtually all RPEs would be required to render most objects. Typically, 10×10 polygons are used to y provide performance statistics from graphics systems. A 10×10 triangle would contain 50 pixels. If NUM_RPE is 32 then the average RPE, after performing steps 1, 2, and 3 would render 1.56 pixels. If NUM_RPE were doubled to 64, then the average RPE would still have to perform steps 1, 2, and 3, and would then render less than one pixel. The result is a system whose performance does not scale well as RPEs are added.

Column interleaving, by contrast, suffers from none of the above limitations. Using column interleaving, the mask can be computed quickly and simply as described above. Moreover, when NUM_RPE is 32, a 10×10 triangle would require, on average, about 10 of the 32 RPEs, or about 30%, to participate in the rendering, allowing the remaining RPEs to begin processing. With column interleaving, regardless of the number of RPEs added, the number of processors required to render the 10×10 triangle does not increase. Additionally, with column interleaving only those RPEs required to draw pixels are required to perform steps 1, 2, and 3. Put another way, any RPE that performs steps 1, 2, and 3 will always have pixels to draw in step 4. Furthermore, each RPE will typically be required to draw a series of consecutive pixels thus amortizing the processing cost of steps 1, 2, and 3 over a larger number of resulting pixels.

The column interleaved frame buffer, FIG. 2, can feed a high resolution raster display system, with current VRAM technology, if NUM_RPE is at least 4. If NUM_RPE is higher, then slower memories can be used.

While the present invention has specifically been described with reference to a column interleaved frame buffer, it can also be adaptable to a row interleaved frame buffer. Thus, when the word column is used herein, it should be understood as applying also to a row in a row or scan line interleaved system. However, while a row or scan line interleaving scheme could utilize the processing advantages of the present invention using column interleaving, it is, however, presently difficult to design and build a raster display subsystem 160 for a scan line interleaved distributed frame buffer. This results from the requirement that a series of consecutive pixels be fetched from a single RPE frame buffer while generating the video output signal. To generate a high-resolution (1280×1024) video signal, an RPE would be required to output a pixel to the raster display subsystem at speeds of up to 110 MHZ. This would require that the frame buffer be interleaved over several banks of memory in each RPE, resulting in increased cost and complexity.

Contiguous block interleaving also poses the same raster display problems as scan line interleaving and provides very poor load balancing.

The present invention of using a column interleaved frame buffer with masked transformation input provides several advantages. One advantage is effective load balancing for most scenarios: narrow view ports, especially those whose width is fewer than NUM_RPE will not load balance well. Another advantage is scalability: as RPEs are added near linear improvements in performance should be obtained. Yet another advantage is algorithm efficiency: pixels are contiguous in one dimension. No overhead is required for objects not processed by an RPE. A further advantage is raster display complexity: additional interleaving of memory devices within an RPE is not required.

What has been described is merely illustrative of the application of the principles of the present invention. In an alternative embodiment, the broadcast mask calculator 112, rather than identifying the first and last RPEs, may, instead, be used to generate one bit for each RPE in the system. A preselected status of each bit would designate whether or not an individual RPE is required to render an object to be displayed. These bit statuses would be used as the input control signals 43 which enable the inputs to RPEs. Thus, such an arrangement would eliminate the need for the mask lookup tables 13a-13e. Thus, other methods and circuits can be implemented by those skilled in the art without departing from the spirit and scope of the present invention.

We claim:

1. A graphics generation system comprising
   means for assigning columns of pixels of a prestored image to successive rendering processor elements of a group of processor elements on a cyclically recurring basis,
   means for routing object data, representing an object extending over several columns in said image, to selected processor elements of said group of processor elements for concurrent processing thereat, said selected processor elements being selected to include all processor elements necessary to process any scan line of said object, each of said selected processor elements assigned to render a column of pixels of said object, each of said selected processor elements being used to concurrently process all scan lines of said object.

2. The system of claim 1 wherein said routing means comprises
   means for determining which columns of pixels are required to render said object on said display and
   means for enabling said selected processor elements to receive said object data and one or more system commands.

3. The system of claim 1 wherein said routing means includes means for specifying each selected processor element using a separate control signal.

4. The system of claim 1 wherein said routing means includes
   means for routing information specifying a first and a last processor element of said selected processor elements utilized to render said object and
   means for decoding said specified first and last processor element information to enable said selected processor elements.

5. The system of claim 4 wherein said decoding means includes lookup table means for identifying each processor element between said specified first and last processor element.

6. The system of claim 5 wherein said lookup table means is a read-only-memory (ROM) device.

7. The system of claim 5 wherein said lookup table means is a preinitialized random-access-memory (RAM) device.

8. The system of claim 1 wherein said assigning means splits the rows of said display into a plurality of segments, each segment containing full, contiguous rows of pixels of said display, each segment utilizing an associated group of rendering processor elements and, within each segment, columns of pixels of said display are assigned to successive processor elements of said associated processor element group on a cyclically recurring basis.

9. The system of claim 1 wherein said assigning means assigns sequential columns of pixels of said image to said successive processor elements such that adjacent columns are assigned to adjacent processor elements.

10. A method of operating a graphics operation system comprising the steps of
    assigning columns of pixels of a prestored image to successive rendering processor elements of a group of processor elements on a cyclically recurring basis, and
    routing object data, representing an object extending over several columns in said image, to selected processor elements of said processor element group for concurrent processing thereat, said selected processor elements being selected to include all processor elements necessary to process any scan line of said object, each of said selected processor elements assigned to render a column of pixels of said object, each of said selected processor elements being used to concurrently process all scan lines of said object.

11. The method of claim 10 wherein said routing step comprises the steps of
    determining which columns of pixels are required to render said object on said display and
    enabling said selected processor elements to receive said object data and one or more system commands.

12. The method of claim 11 wherein said determining step includes the step of
    specifying each selected processor element using a separate control signal and wherein
    said enabling step uses said separate control signal to enable each selected processor element.

13. The method of claim 11 wherein said determining step includes the steps of
    specifying a first and a last processor element of said selected processor elements utilized to render said object,
    sending an address code identifying said first and last processor elements to said enabling means and wherein
    said enabling step includes the step of
    decoding said address code and enabling each processor element identified as being between said specified first and last processor element.

14. The method of claim 13 wherein said decoding step decodes said address code by using a lookup table.

15. The method of claim 10 wherein said assigning step splits the rows of said display into a plurality of segments, each segment containing full, contiguous rows of pixels of said display, each segment utilizing an associated group of rendering processor elements and, within each segment, columns of pixels of said display are assigned to successive processor elements of said associated processor element group on a cyclically recurring basis.

16. A display system comprising
    means for assigning columns of pixels of a prestored image to successive rendering processor elements of a group of processor elements on a cyclically recurring basis,
    means for routing object data, representing an object extending over several columns in said image, to selected processor elements of said group of processor elements for concurrent processing thereat, said selected processor elements being selected to include all processor elements necessary to process any scan line of said object, each of said selected processor elements assigned to render a column of pixels of said object, each of said selected processor elements being used to concurrently process all scan lines of said object,
    means for outputting an image signal from said selected processor elements and
    means for displaying said output image signal.

* * * * *